(12) United States Patent
Ek et al.

(10) Patent No.: US 9,554,229 B2
(45) Date of Patent: Jan. 24, 2017

(54) AMPLIFYING AUDIO-VISUAL DATA BASED ON USER'S HEAD ORIENTATION

(75) Inventors: Martin Ek, Dalby (SE); Per Magnus Landqvist, Lund (SE); Par-Anders Aronsson, Malmo (SE); Ola Thorn, Limhamn (SE); Gert Magnus Jendbro, Staffanstorp (SE); Par Stenberg, Veberod (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 371 days.

(21) Appl. No.: 13/823,879

(22) PCT Filed: Jan. 13, 2012

(86) PCT No.: PCT/IB2012/050180
§ 371 (c)(1),
(2), (4) Date: Mar. 15, 2013

(87) PCT Pub. No.: WO2013/064914
PCT Pub. Date: May 10, 2013

(65) Prior Publication Data
US 2014/0010391 A1  Jan. 9, 2014

Related U.S. Application Data

(60) Provisional application No. 61/553,382, filed on Oct. 31, 2011.

(51) Int. Cl.
*H04S 7/00* (2006.01)
*G06F 3/01* (2006.01)
*G06F 3/16* (2006.01)

(52) U.S. Cl.
CPC .............. *H04S 7/304* (2013.01); *G06F 3/011* (2013.01); *G06F 3/012* (2013.01); *G06F 3/165* (2013.01)

(58) Field of Classification Search
None
See application file for complete search history.

(56) References Cited

U.S. PATENT DOCUMENTS

2002/0111705 A1* 8/2002 Coles et al. ................... 700/94
2003/0223602 A1* 12/2003 Eichler et al. ............... 381/309
(Continued)

FOREIGN PATENT DOCUMENTS

WO  2008109619 A2  9/2008
WO  2010078372 A1  7/2010

OTHER PUBLICATIONS

Warusfel O et al: "Argumenting everyday environments through interactive soundscapes", Proc of the 12th Annual Symposium on Haptic Interfaces for Virtual Environments and Tele-Operator Systems, IEEE-VR2004, Jan. 1, 2004, pp. 1-3, XP007920616, paragraphs 0IIA, 0III, 00IV.
(Continued)

*Primary Examiner* — Mark Fischer
(74) *Attorney, Agent, or Firm* — Tucker Ellis, LLP

(57) ABSTRACT

One or more devices may receive, from a media presentation device worn by a user, sensory data comprising at least information describing orientation of the media presentation device. The one or more devices may also determine an approximate direction of a gaze of the user in a three dimensional audio space based on the information describing the orientation of the media presentation device, identify a sound source at which the user gazes based on the approximate direction of the gaze of the user in the three dimensional audio space, obtain audio data associated with the sound source based on an identity of the identified sound source, determine an action to perform on the audio data associated with the sound source, and perform the determined action.

18 Claims, 11 Drawing Sheets

(56) References Cited

U.S. PATENT DOCUMENTS

| | | | |
|---|---|---|---|
| 2004/0104934 A1 | 6/2004 | Fager et al. | |
| 2004/0119986 A1* | 6/2004 | Benke | G01C 21/20 |
| | | | 356/614 |
| 2005/0175218 A1* | 8/2005 | Vertegaal et al. | 382/103 |
| 2006/0238877 A1* | 10/2006 | Ashkenazi et al. | 359/630 |
| 2008/0120561 A1* | 5/2008 | Woods | 715/764 |
| 2010/0053555 A1 | 3/2010 | Enriquez et al. | |
| 2011/0019874 A1* | 1/2011 | Jarvenpaa et al. | G06F 3/013 |
| | | | 382/103 |
| 2011/0029918 A1* | 2/2011 | Yoo et al. | 715/800 |
| 2011/0221656 A1* | 9/2011 | Haddick et al. | 345/8 |
| 2012/0050493 A1* | 3/2012 | Ernst et al. | G02B 27/017 |
| | | | 348/47 |
| 2012/0113092 A1* | 5/2012 | Bar-Zeev et al. | 345/419 |
| 2012/0257036 A1* | 10/2012 | Stenberg et al. | 348/78 |

OTHER PUBLICATIONS

International Search Report dated May 29, 2012, issued in corresponding PCT application PCT/IB2012/050180, 16 pages.

* cited by examiner

AMPLIFYING AUDIO-VISUAL DATA BASED ON USER'S HEAD ORIENTATION

BACKGROUND

A media device may enhance sensory data (e.g., audio, visual) that a user may otherwise perceive and may provide the enhanced sensory data (e.g., acoustic information) to the user. The enhanced sensory data may include data resulting from a transformation of the original data, as well as metadata pertaining to the original data.

SUMMARY

According to one aspect, a mobile communication device may include one or more communication interfaces configured to communicate with a media presentation device. The mobile communication device may also include one or more processors. The one or more processors may be configured to receive, via the one or more communication interfaces, from the media presentation device, sensory data comprising at least information describing orientation of the media presentation device; determine an approximate direction of a gaze of a user in a three dimensional audio space based on the information describing the orientation of the media presentation device; obtain audio data based on the approximate direction; determine an action to perform on the audio data associated with the approximate direction; and perform the action.

Additionally, when the one or more processors determine the action, the one or more processors may be further configured to modify the audio data such that a sound generated based on the audio data is amplified.

Additionally, when the one or more processors determine the action, the one or more processors may be further configured to receive additional sensory data that describes one of a change in facial feature of the user, or movement of a head of the user.

Additionally, the mobile communication device may include one of a cellular telephone, a laptop computer, or a tablet computer.

Additionally, the sensory data may include at least one of images of the eyes of the user, or information describing a location of the media presentation device.

Additionally, the media presentation device may include one of a pair of ear buds, a pair of virtual reality glasses, or a pair of augmented reality glasses.

According to another aspect, a device may include a display configured to display images, sensors configured to collect sensory data comprising at least images of eyes of a user, and one or more processors. The one or more processors may be configured to: receive the sensory data from the sensors; determine an approximate direction of a gaze of the user based on the images, included in the sensory data, of the eyes of the user; identify an image, on the display, of a sound source at which the user gazes based on the approximate direction of the gaze; identify the sound source based on the identified image; obtain audio data associated with the sound source based on the identified sound source; determine an action to perform, on the audio data associated with the sound source; and perform the action.

Additionally, when the one or more processors perform the action, the one or more processors may be configured to apply a transformation to the audio data to amplify an audio signal corresponding to the audio data, and send the amplified audio signal to a remote media presentation device.

Additionally, when the one or more processors perform an action, the one or more processors may be further configured to apply a head-related transform to the audio data to generate a stereo sound that is perceived by the user as emanating from a specific location of the image in a three dimensional audio space.

According to yet another aspect, a method may include: receiving, from a media presentation device worn by a user, sensory data comprising at least information describing orientation of the media presentation device; determining an approximate direction of a gaze of the user in a three dimensional audio space based on the information describing the orientation of the media presentation device; identifying a sound source at which the user gazes based on the approximate direction of the gaze of the user in the three dimensional audio space; obtaining audio data associated with the sound source based on an identity of the identified sound source; determining an action to perform on the audio data associated with the sound source; and performing the determined action.

Additionally, the sensory data may further include images of the user's eyes.

Additionally, determining the approximate direction of the gaze may include determining a direction of the gaze based on the information describing the orientation of the media presentation device and a direction of user's eyes, wherein the direction of the user's eyes may be determined based on the images of the user's eyes.

Additionally, identifying the sound source may include: identifying an object in the three dimensional audio space based on location of the user, the approximate direction of the gaze, and information in a map database; and determining whether the identified object is the identified sound source.

Additionally, performing the action may include one of: amplifying the obtained audio data; or ending amplification of the obtained audio data.

Additionally, the method of claim may further include: performing image recognition on images that are received as part of the sensory data when the identified object is not the sound source; identifying images corresponding to different objects based on the image recognition; selecting, among the identified images, an image corresponding to the sound source based on the approximate direction of the gaze; and identifying the sound source based on the selected image and information associated with the selected image.

Additionally, determining whether the identified object is the identified sound source may include at least one of: determining whether an image of the sound source matches an image of the identified object obtained from a database; or determining whether a distance from the identified object to the user is approximately equal to a distance from the sound source to the user.

Additionally, identifying the sound source may include: determining a point, in a field of view of the user in the three dimensional audio space, at which the user gazes based on the approximate direction of the gaze; and identifying an object whose corresponding image, in the field of view, includes the point.

Additionally, performing the action may include locking the sound source in a particular location within the three dimensional audio space.

Additionally, the three dimensional audio space may include a virtual three dimensional audio space.

Additionally, identifying the sound source may include sending information describing a location of the user and the approximate direction of the gaze to a remote device over a network, wherein the remote device is configured to identify the sound source and retrieve the audio data from a database based on an identity of the sound source, and wherein obtaining the audio data includes receiving the audio data from the remote device.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION

Figure 1A:
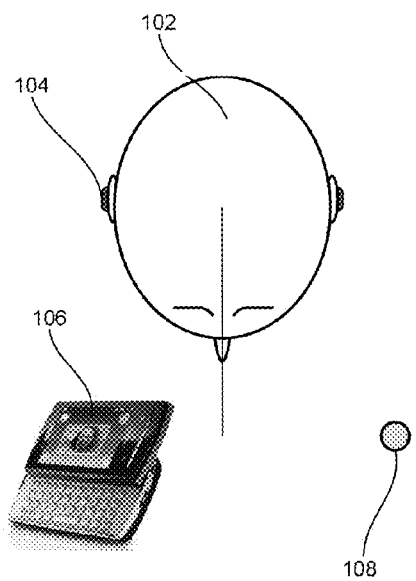
FIGS. 1A through 1D illustrate an exemplary process that is associated with selecting a sound based on a user's head orientation.
Figure 1B:
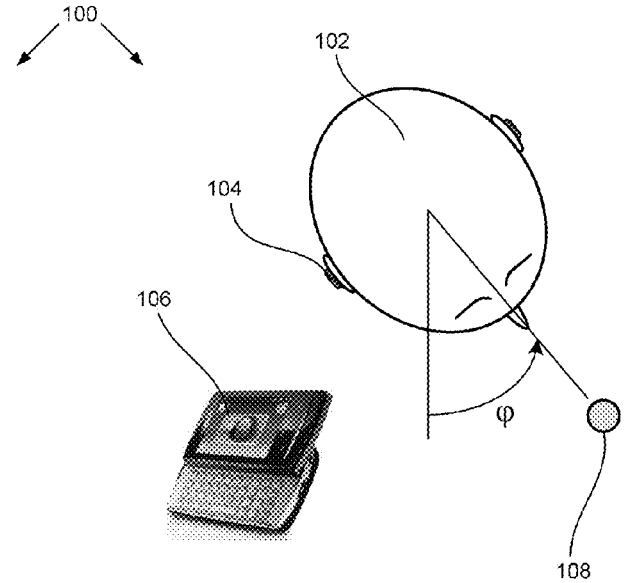
Figure 1C:
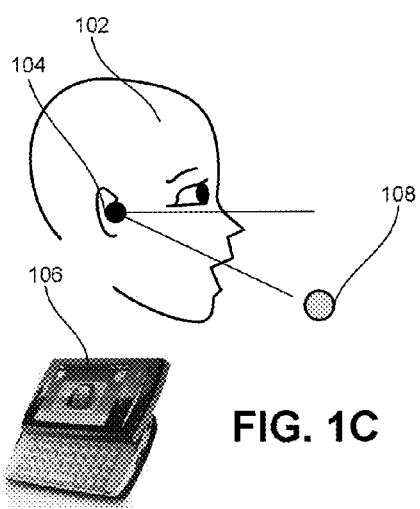
Figure 1D:
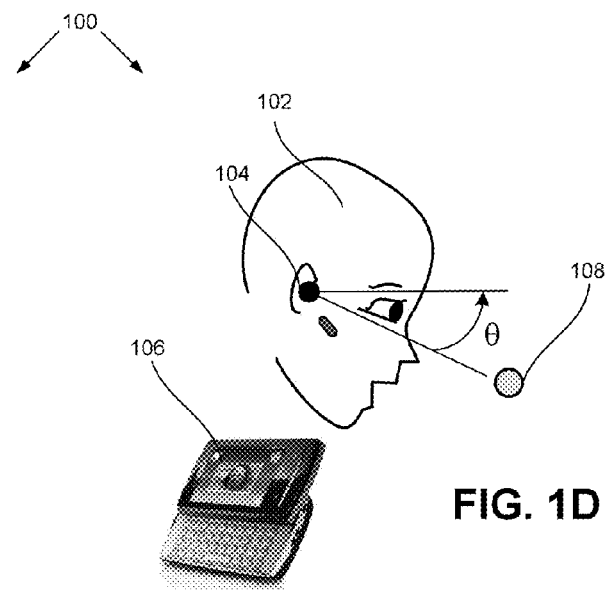

The following detailed description refers to the accompanying drawings. The same reference numbers in different drawings may identify the same or similar elements. As used herein, the term "amplifying data" may refer to transforming an audio-related or audio portion of the data such that the magnitude of an audio signal (digital or analog) generated from the transformed audio portion data is greater than the magnitude of an audio signal (digital or analog) generated from the original audio portion of the data.

In implementations described herein, a device may determine user's head orientation and/or the direction of the user's gaze. Based on the user's head orientation and/or the direction of the gaze, the device may amplify, modify, or play audio-visual or (AV) data (e.g., amplify a sound) associated with an audio source (herein referred to as an "object" or a "point" in a three-dimensional audio space) at which the user gazes.

FIGS. 1A through 1D illustrate an exemplary process that is associated with selecting a sound based on the user's head orientation. As shown, an acoustic environment 100 may include a user's head 102, a media presentation device 104 (e.g., headphone, an ear bud, etc.), a mobile communication device 106, and an object 108. Depending on the implementation, acoustic environment 100 may include additional or different devices than those shown in FIGS. 1A through 1D.

Media presentation device 104 may receive signals from mobile communication device 106 over a wired or wireless communication link, and perform operations that are related to sounds or images based on the signals (e.g., amplify a sound). The operation may include amplifying, generating, or transforming sounds/images. In FIGS. 1A-1D, media presentation device 104 is shown as an ear bud, although media presentation device 104 may include another type of device (e.g., a headphone, a display, etc.).

Consistent with the implementations described herein, media presentation device 104 may include a number of components for determining its orientation and, consequently, the orientation of user's head 102. Such components may include, for example, a gyroscope, accelerometer, or compass (e.g., micro-electromechanical system (MEMS) gyroscope, MEMS accelerometer, MEMS compass, etc.). Media presentation device 104 may transmit orientation information from these components to mobile communication device 106.

Mobile communication device 106 may include any of the following devices to which a media presentation device 104 may be coupled (e.g., via a headphone jack or wirelessly): a personal computer; a tablet computer; a cellular or mobile telephone; a smart phone; a laptop computer; a personal communications system (PCS) terminal that may combine a cellular telephone with data processing, facsimile, and/or data communications capabilities; a personal digital assistant (PDA) that includes a telephone; a gaming device or console; a peripheral (e.g., wireless headphone); a digital camera; a music playing device; or another type of computational or communication device.

Object 108 may include a source of sound in three dimensional (3D) audio space. The object may correspond to an object in either real or virtual space. A real object (a real sound source) may exist in a physical 3D space of the user. A virtual object is a representation of a real object or idealized object. The virtual object may exist as data in a computer memory. If the virtual object is associated with a 3D image or sound, the virtual object may be perceived by the user, for example, via a display or earphones. The virtual object may be perceived by the user as if the object is at a particular location within a virtual, 3D space. For example, assume that the user is in 3D audio space whose sound is conveyed to the user via headphones attached to mobile communication device 106. The user may perceive the sound from object 108 as if object 108 were located at the left side of the user, as illustrated in FIG. 1A.

In the process illustrated in FIGS. 1A-1D, head 102 may change its orientation in different ways. For example, head 102 may rotate from the position illustrated in FIG. 1A to that in FIG. 1B by rotating head 102 by an azimuth angle, $\phi$ degrees. In another example, head 102 may rotate from the position illustrated in FIG. 1C to that in FIG. 1D by an inclination angle $\theta$.

When mobile communication device 106 receives orientation information (information indicating a change in orientation) from media presentation device 104, mobile communication device 106 may determine the current direction in which head 102 faces based on the orientation information. Furthermore, based on the determined direction and the current location of mobile device 106, mobile communication device 106 may identify an object, a source of sound/image, in 3D space) at which the user gazes. Mobile communication device 106 may then perform different actions pertaining to AV data associated with the gazed object.

For example, mobile communication device 106 may amplify or play the AV data (e.g., at mobile communication device 106 or media presentation device 104), stop playing or amplifying the AV data, select and focus on the object (or a location in the 3D space) associated with AV data, and deselect the object.

Figure 2:
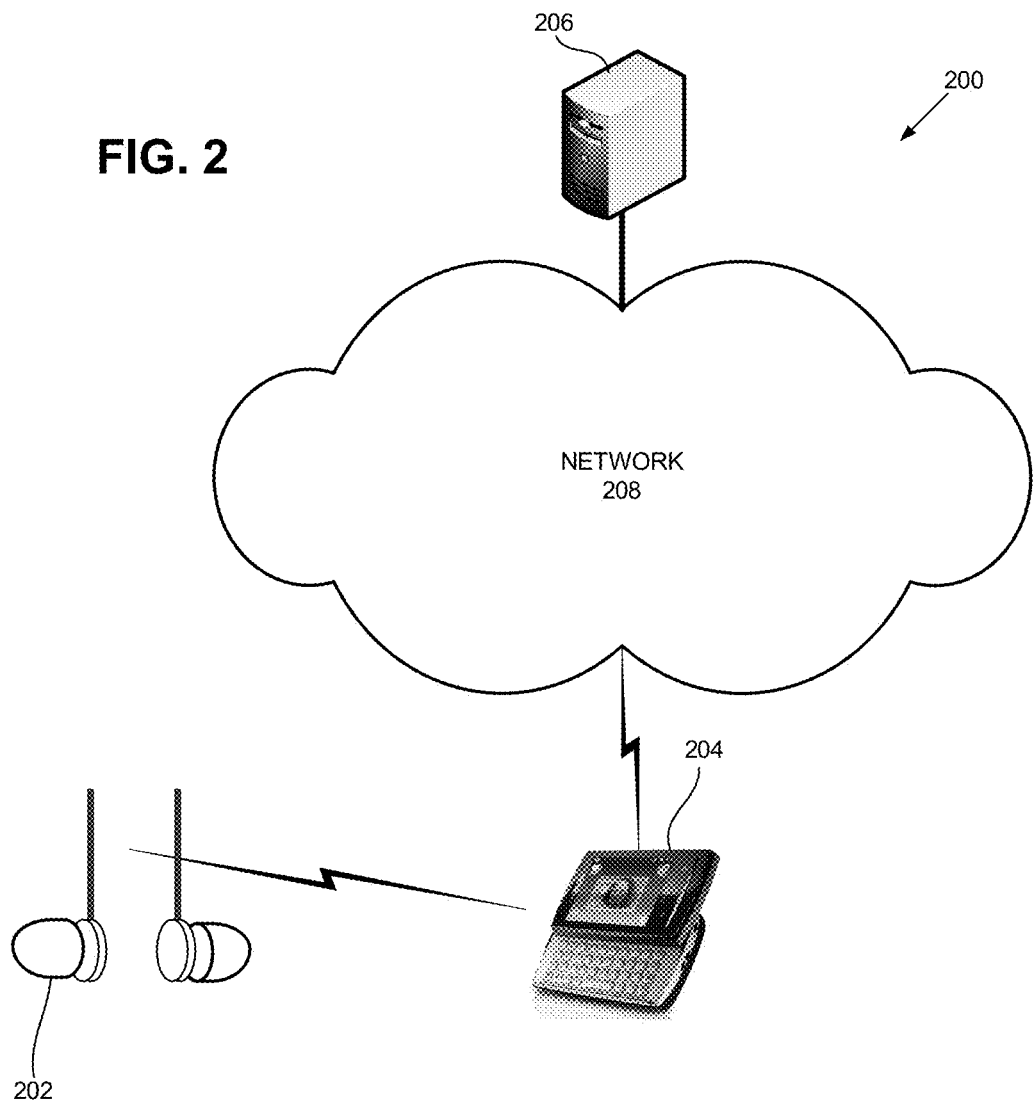
FIG. 2 shows an exemplary network in which concepts described herein may be implemented.

FIG. 2 shows an exemplary network in which concepts described herein may be implemented. As shown, network 200 may include media presentation device 202, a mobile communication device 204, a server device 206, and a network 208. Although media presentation device 202 is illustrated as an ear bud 202 in FIG. 2, in a different implementation, media presentation device 202 may include another type of device (e.g., headphone).

Media presentation device 202 and mobile communication device 204 may include similar components and operate similarly as media presentation device 104 and mobile communication device 106, respectively. However, information that media presentation device 202 sends to mobile communication device 204 may include more than information pertaining to the orientation of user's head 102. The information (herein referred to as "sensory data") that media presentation device 202 sends to mobile communication device 204 may also include images of user's eyes, images of scenes/objects in front of media presentation device 202, the distance between media presentation device 202 an object in front of media presentation device 202 (e.g., an object at which the user gazes), the physical location of media presentation device 202, etc.

As described above, mobile communication device 204 may determine the overall direction in which the user looks/gazes based on the sensory data from media presentation device 202. In addition, mobile communication device 204 may determine its current location. Subsequently, mobile communication device 204 may send a media request to a logical component, hereinafter termed "media logic," that is installed on either mobile communication device 204 or on server device 206, depending on the implementation.

A media request may include one or more of the following: information describing directions at which a user gazes (e.g., a direction that is relative to the user's head and/or a direction that is relative to the earth's inertial frame, etc.); a location of the user or mobile communication device 204; images of scenes/objects in front of media presentation device 202; and/or a distance between media presentation device 202 and an object in front of media presentation device 202 (e.g., object at which the user gazes). Depending on the implementation, a media request may include more, less, or different information.

Upon receipt of the media request, the media logic may identify the direction in/object at which the user gazes, based on information (see above) included in the media request. Based on the location/identity of the object, the media logic may determine and perform possible actions pertaining to AV data associated with the location/object.

If the media logic is hosted on mobile communication device 204, when mobile communication device 204 passes the media request to the media logic, intra-process or inter-process exchange of data may occur within mobile communication device 204. If the media logic is hosted on server device 206, mobile communication device 204 may pass the request to server device 206 over network 208.

Server device 206 may include a map of AV data in 3D space. When server device 206 receives a media request for AV data from mobile communication device 204, server device 206 (or the media logic in server device 206) may identify an object (e.g., 3D audio source) corresponding to information provided in the media request. In response to the request, server device 206 may retrieve AV data associated with the object, process the AV data, and send the processed AV data to mobile communication device 204.

Network 208 may include a cellular network, a public switched telephone network (PSTN), a local area network (LAN), a wide area network (WAN), a wireless LAN, a metropolitan area network (MAN), personal area network (PAN), a Long Term Evolution (LTE) network, an intranet, the Internet, a satellite-based network, a fiber-optic network (e.g., passive optical networks (PONs)), an ad hoc network, any other network, or a combination of networks. Devices in network 200 may connect to network 208 via wireless, wired, or optical communication links.

Devices 202-206 and network 208 are illustrated for simplicity. Depending on the implementation, network 200 may include additional devices (e.g., additional server devices), fewer devices, different devices, and/or different arrangement of devices than those illustrated in FIG. 2. Furthermore, although not shown, network 208 may include other types of network elements, such as routers, switches, bridges, gateways, transmission towers, etc.

Figure 3:
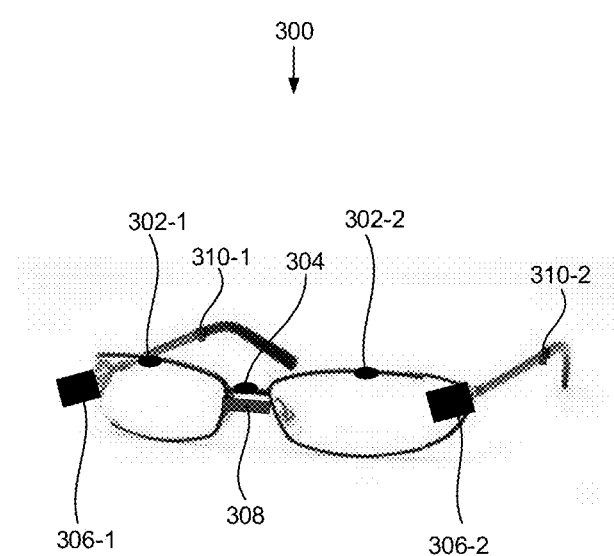
FIG. 3 shows exemplary device that is associated with selecting audio-visual (AV) data based on a user's head orientation.

FIG. 3 shows an exemplary media presentation device 300 according to another implementation. In FIG. 3, device 300 is depicted as a pair of augmented/virtual reality glasses. Like media presentation device 202 (e.g., ear bud), device 300 may receive signals from mobile communication device 204 over a wired or wireless communication link and generate sounds/images based on the signal. Like device 202, device 300 may send sensory data to mobile communication device 204.

As shown, device 300 may include eye cameras 302-1 and 302-2, front camera 304, projectors 306-1 and 306-2, position/distance sensor 308, speakers 310-1 and 310-2. Eye cameras 302-1 and 302-2 may capture images of user's eyes. Front camera 304 may receive and capture images from the surroundings (e.g., images facing device 300 when a user wears device 300). Projectors 306-1 and 306-2 and speakers 310-1 and 310-2 are described below. Position/distance sensors 308 may determine the position and/or orientation of device 300. In addition, position/distance sensor 308 may determine distances from device 300 to one or more objects in a field of view of the user wearing device 300. Device 300 may send the eye images, the captured images of the surroundings, the position/orientation information, and the distance information, as sensory data, to mobile communication device 204.

Depending on the implementation or configuration, mobile communication device 204 may send AV data to device 300 to play 3D sounds, show virtual reality images, augmented reality images, and/or other images (e.g., images for games, entertainment, live events, television programs, etc.). At device 300, projectors 306-1 and 306-2 may project the images onto the lens-like screens and play sounds at speakers 310-1 and 310-2. In one implementation, speakers 310-1 and 310-2 may operate in combination to render 3D sounds in real time or near real time.

Depending on the implementation, device 300 may include additional, fewer, different, or different arrangement of components than those illustrated in FIG. 3. For example, in one implementation, display screens may exclude lens-like display screens, and include non-transparent LED screens (without projectors 306-1 and 306-2). Each of the LED screens may face one of the viewer's eyes. In such an implementation, rather than having the viewer receive some of the real-world images directly through the lenses, the images may be first received through a camera(s), processed at a remote device (e.g., mobile communication device 204), and transmitted back to device 300 to be displayed at the LED screens.

Figure 4:
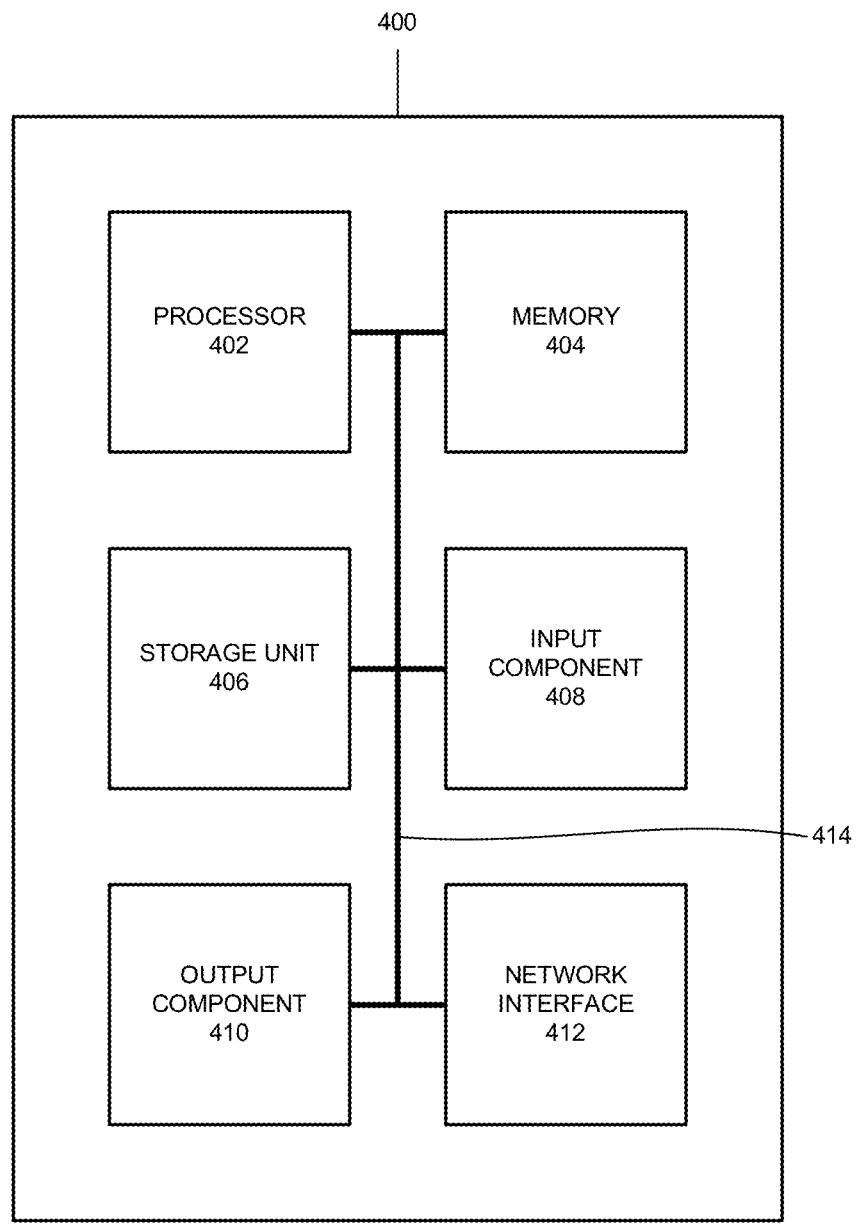
FIG. 4 is a block diagram of exemplary components of devices in FIG. 2.

FIG. 4 is a block diagram of exemplary components of a device 400, which may represent or correspond to any of devices 104, 106, 202-206, and 300. As shown in FIG. 4, device 400 may include a processor 402, memory 404, storage unit 406, input component 408, output component 410, network interface 412, and communication path 414.

Processor 402 may include a microprocessor, an Application Specific Integrated Circuit (ASIC), a Field Programmable Gate Array (FPGA), and/or other processing logic (e.g., audio/video processor) capable of processing information and/or controlling device 400. Memory 404 may include static memory, such as read only memory (ROM), and/or dynamic memory, such as random access memory (RAM), or onboard cache, for storing data and machine-readable instructions. Storage unit 406 may include storage devices, such as a floppy disk, CD ROM, CD read/write (R/W) disc, and/or flash memory, as well as other types of storage devices.

Input component 408 and output component 410 may include a display screen, a keyboard, a mouse, a speaker, a microphone, a GPS receiver, a camera, a gyroscope, an accelerometer, a compass, range finder, a Digital Video Disk (DVD) writer, a DVD reader, Universal Serial Bus (USB) port, and/or other types of components for converting physical events or phenomena to and/or from digital signals that pertain to device 400. In one implementation, input component 408 may include audio sensors (e.g., microphones) for mapping a 3D audio space. Via the audio sensors, device 400 may associate different directions of the 3D space with specific sounds in real time or near real time.

Network interface 412 may include a transceiver that enables device 400 to communicate with other devices and/or systems. For example, network interface 412 may communicate via a network, such as the Internet, a terrestrial wireless network (e.g., a WLAN), a cellular network, a satellite-based network, a wireless personal area network (WPAN), etc. Additionally or alternatively, network interface 412 may include a modem, an Ethernet interface to a LAN, and/or an interface/connection for connecting device 400 to other devices (e.g., a Bluetooth interface, WiFi interface, etc.). For example, in some implementations, device 400 (e.g., device 202/300) may communicate with mobile communication device 204 via Bluetooth interfaces.

Communication path 414 may provide an interface through which components of device 400 can communicate with one another.

In different implementations, device 400 may include additional, fewer, or different components than the ones illustrated in FIG. 4. For example, device 400 may include additional network interfaces, such as interfaces for receiving and sending data packets. In another example, device 400 may include a tactile input device.

Figure 5:
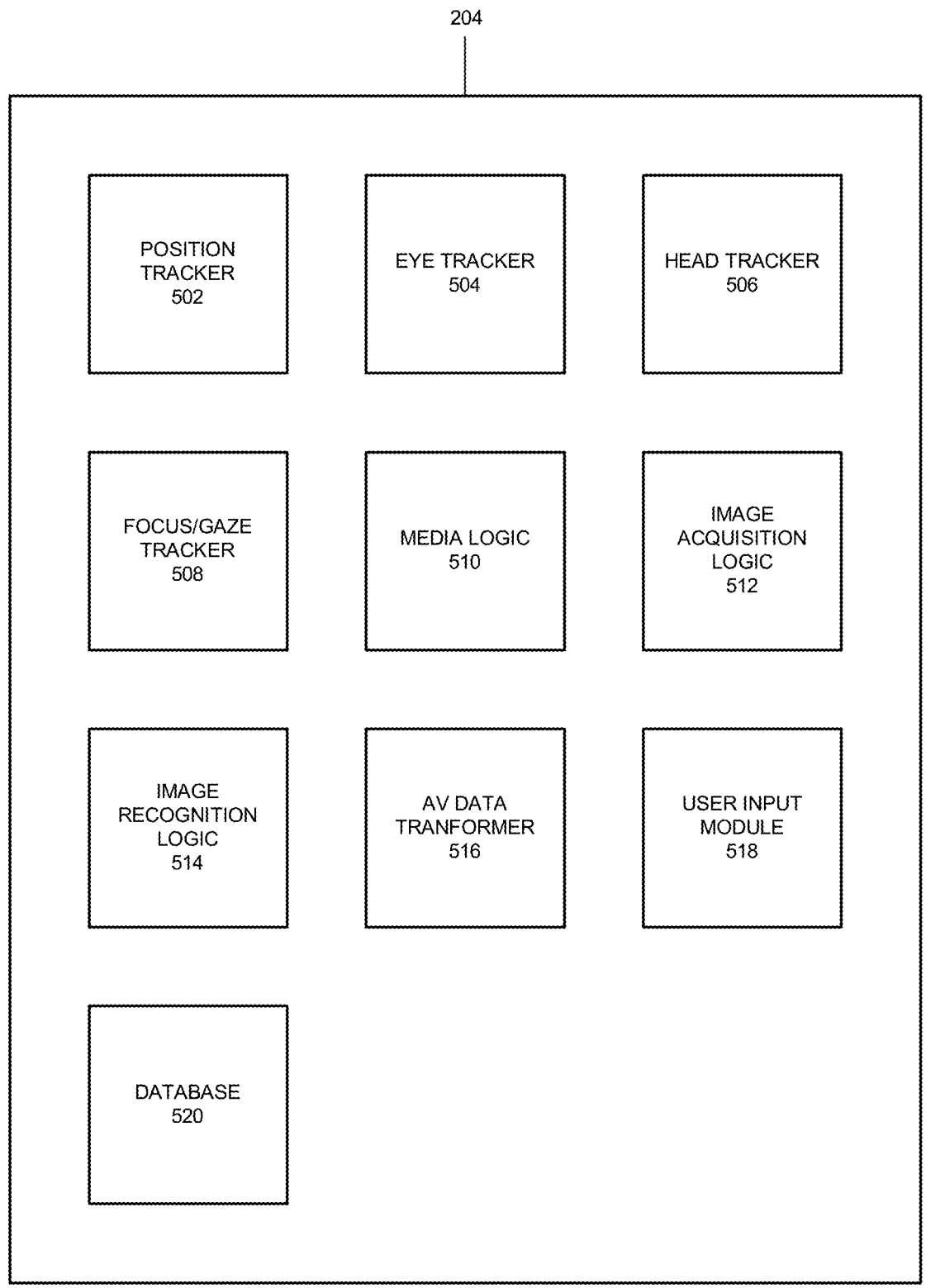
FIG. 5 is a block diagram of exemplary functional components of a mobile communication device of FIG. 2.

FIG. 5 is a block diagram of exemplary functional components of mobile communication device 204. As shown, mobile communication device 204 may include a position tracker 502, eye tracker 504, head tracker 506, focus/gaze tracker 508, media logic 510, image acquisition logic 512, image recognition logic 514, AV data transformer 516, user input module 518, and database 520. All or some of the components illustrated in FIG. 5 may be implemented by processor 402 executing instructions stored in memory 404.

Position tracker 502 may receive position/orientation information from a component (e.g., a GPS receiver) within mobile communication device 204 or media presentation device 202/300. Based on the information, position tracker 502 may determine and track the geographical location/position of mobile communication device 204 or of the user (e.g., who wears an ear bud 202). Position tracker 502 may provide the location/position information to another component of mobile communication device 204, such as focus/gaze tracker 508, or to another device (e.g., server device 206).

Eye tracker 504 may receive information for tracking eyes (e.g., images of the user's pupils, lens, iris, etc.) from media presentation device 202/300 or from a camera installed on mobile communication device 204. Based on the information, eye-tracker 504 may track the movements of user's eyes and use positions of the eyes to calculate the direction of the user's gaze, relative to the user's head.

Head tracker 506 may receive user's head orientation information from media presentation device 202/300. Based on the information, head tracker 506 may determine and track the orientation of user's head 102 (e.g., azimuth angle and inclination angle).

Focus/gaze tracker 508 may determine the overall direction of the user's gaze, based on the relative direction of user's gaze and the orientation of the user's head, using output from eye tracker 504 and head tracker 506.

Media logic 510 may retrieve and process AV data associated with the overall direction of the gaze of the user. For example, in some implementations, media logic 510 may identify an object at which the user gazes based on information included in a media request and perform actions pertaining to AV data associated with the object.

Figure 6:
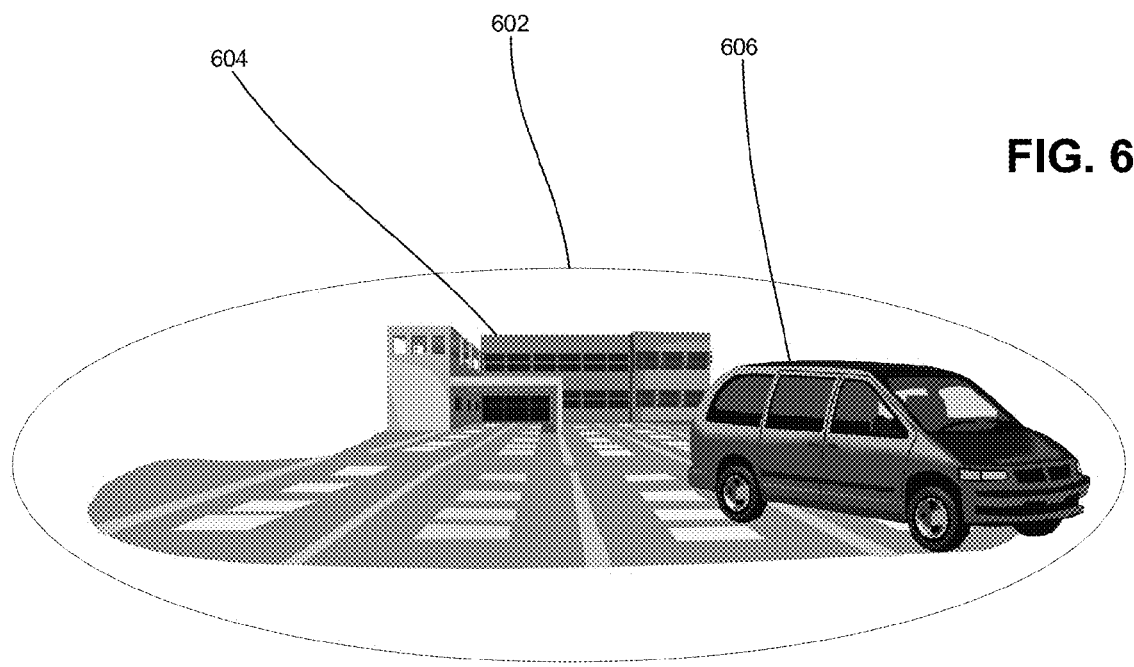
FIG. 6 illustrates exemplary processing that is associated with the media logic of FIG. 5.

FIG. 6 illustrates exemplary processing that is associated with media logic 510. Assume that view 602 shows a building 604 and an automobile 606. Different views may include images of different things, places, etc.

In FIG. 6, as the user turns head 102 toward building 604, device 202/300 may send sensory data to mobile communication device 204. Based on the sensory data, eye tracker 504, head tracker 506, and focus/gaze tracker 508 in mobile communication device 204 may determine the overall direction of the user's gaze and generate a media request. Media logic 510 may use the overall direction of the user's gaze and/or other information in the media request to obtain AV data associated with a point at which the user gazes ("gazed point").

Specifics of how media logic 510 obtain AV data based on the media request may depend on whether view 602 is a view of a physical 3D audio space, an augmented reality 3D audio space, a virtual reality 3D audio space (a virtual 3D audio space), a game environment, etc. For example, assume that view 602 shows a physical 3D audio space; the user is gazing at automobile 604; and that mobile communication device 204 has a real-time map of different sounds (e.g., the sound of an automobile engine is mapped to a sound direction from the automobile). Based on the map and the overall direction, mobile communication device 204 may determine and/or perform an action relating to AV data that is associated with the direction (e.g., amplifying the engine sound, stopping the amplification of the engine sound, etc.).

In another example, assume that mobile communication device 204 receives sensory data from media presentation device 202. In such an instance, media communication device 204 may obtain a location of mobile communication device 204 from position tracker 502, and the overall direction of the user's gaze from focus/gaze tracker 508. As discussed above, mobile communication device 204 may include the location information, the overall direction of the user's gaze, sensory data received from media presentation device 202/300, etc. in a media request.

When media logic 510 receives the media request, media logic 510 may identify a stationary (e.g., a landmark, store, building, etc.) object at which the user may be gazing. Media logic 510 may perform this process by issuing a query to a database of maps (e.g., database 520), based on the location of the mobile communication device 204 and the overall direction at which the user gazes.

Next, media logic 510 may verify/determine whether the identified stationary object is the gazed object (3D sound source), and not a mobile object (e.g., a car, a pedestrian, a boat, an airplane, etc.) between the stationary object and the user. Media logic 510 may, for instance, compare the distance between the location of mobile communication device 204 and the identified stationary object to the distance provided in the sensory data and thus provided in the media request. If the distances are approximately the same (e.g., the difference of the distances is less than a given threshold), media logic 510 may determine that the identified stationary object is the gazed object.

If the distances are not approximately equal (e.g., the difference of the distances is greater than a threshold), media logic 510 may determine that the user is looking at a mobile object (e.g., automobile 606) different from the identified stationary object. In this case, media logic 510 may determine/identify the gazed object by performing image recognition (e.g., via image recognition logic 514) on images that are provided in the media request. In either case, when the gazed object is identified, media logic 510 may determine and/or perform an action relating to AV data that is associated with the gazed object (e.g., amplifying the AV data, playing the AV data, stopping the playing of AV data, etc.).

In yet another example, assume that view 602 shows a virtual or game 3D audio space. Media logic 510 may obtain the direction at which the user gazes either from eye tracker 504 or focus/gaze tracker 508, and use the directions to identify a gazed, virtual object. Specifics of how media logic 510 uses the directions to identify the gazed virtual object may depend on the implementation of devices in FIGS. 1A-1D, 2 and/or 3.

For example, in implementations in which the display of media presentation device 202 moves with user's head 102 (e.g., a pair of virtual reality glasses worn by the user), media logic 510 may determine the coordinates of a point on the display at which the user gazes based on the output of eye tracker 504. Once media logic 510 determines the screen location at which the user gazes, media logic 510 may identify a virtual object whose image is projected onto the display and corresponds to the gazed screen location. After the identification of the gazed object, media logic 510 may determine and/or perform one or more actions (e.g., amplify, stop amplifying, etc.) relating to AV data that is associated with the gazed object.

Image acquisition logic 512 may obtain images on which image recognition logic 514 may perform image recognition. Image acquisition logic 512, for example, may receive images of a user's view from media presentation device 202/300 and provide the image to image recognition logic 514. In another example, image acquisition logic 512 may receive images from a camera in mobile communication device 204.

Image recognition logic 514 may receive an image from image acquisition logic 512 and identify images of different objects within the received image. For example, assume that image recognition logic 514 receives an image that shows view 602. Image recognition logic 514 may identify building 604 and automobile 606. Image recognition logic 514 may also identify images of eyes, parts of eyes, etc., for eye tracking.

AV data transformer 516 may receive AV data from media logic 510, perform data processing, and send the AV data to media presentation device 202/300. For example, AV data transformer 516 may apply a head-related transfer function (HRTF) in order to render the sound as if the sound is emanating from a particular point in the 3D audio space.

User input module 518 may include graphical user interface (GUI) components for receiving user input. Based on the user input, user input module 518 may configure media logic 510, different applications in mobile communication device 204, etc.

Database 520 may include one or more maps of 3D audio space (e.g., directions of gazes and sounds that are associated with the directions, objects and AV data that are associated with the objects, etc.) identifiers that correspond to physical/virtual objects, images that are associated with physical objects, images that may be used for object recognition, maps, etc.

Depending on the implementation, mobile communication device 204 may include additional, fewer, different, or different arrangement of functional components than those illustrated in FIG. 5 (e.g., an operating system, an email client application, a texting application, etc.). For example, in some implementations, media logic 510, image recognition logic 514, and/or database 520 may not reside in mobile communication device 204 but in another, remote device (e.g., server device 206). In such implementations, mobile communication device 204 may send a media request to the remote device via network interface 412. In another example, media logic 510 and/or image recognition logic 514 may be part of another application (e.g., a game application).

Figure 7:
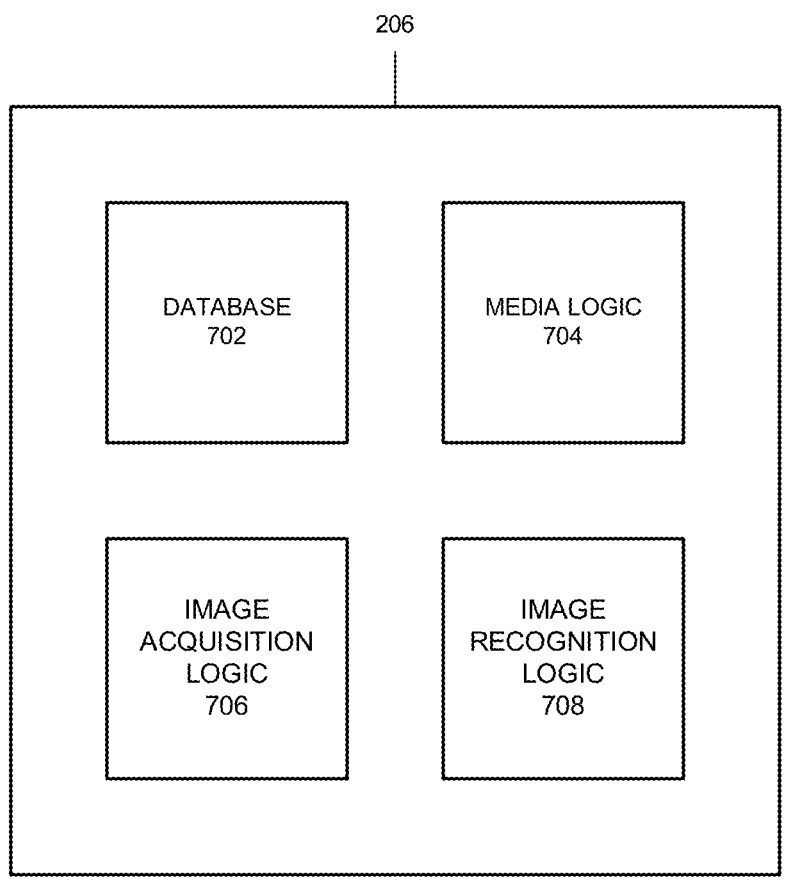
FIG. 7 is a block diagram of exemplary functional components of a server device of FIG. 2.

FIG. 7 is a block diagram of exemplary functional components of server device 206 according to one implementation. As shown, in this implementation, server device 206 may include database 702, media logic 704, image acquisition logic 706, and image recognition logic 708. In other implementations, server device 206 may include additional, fewer, or different functional components than those illustrated in FIG. 7. For example, device 206 may include an operating system, a web server application, etc.

In this implementation, database 702, media logic 704, image acquisition logic 706, and image recognition logic 708 may operate similarly as database 520, media logic 510, image acquisition logic 512, and image recognition logic 514, respectively. In contrast to media logic 510, however, media logic 704 may receive a media request from mobile communication device 204 and send its output to a component in mobile communication device 204 over network 208.

Figure 8:
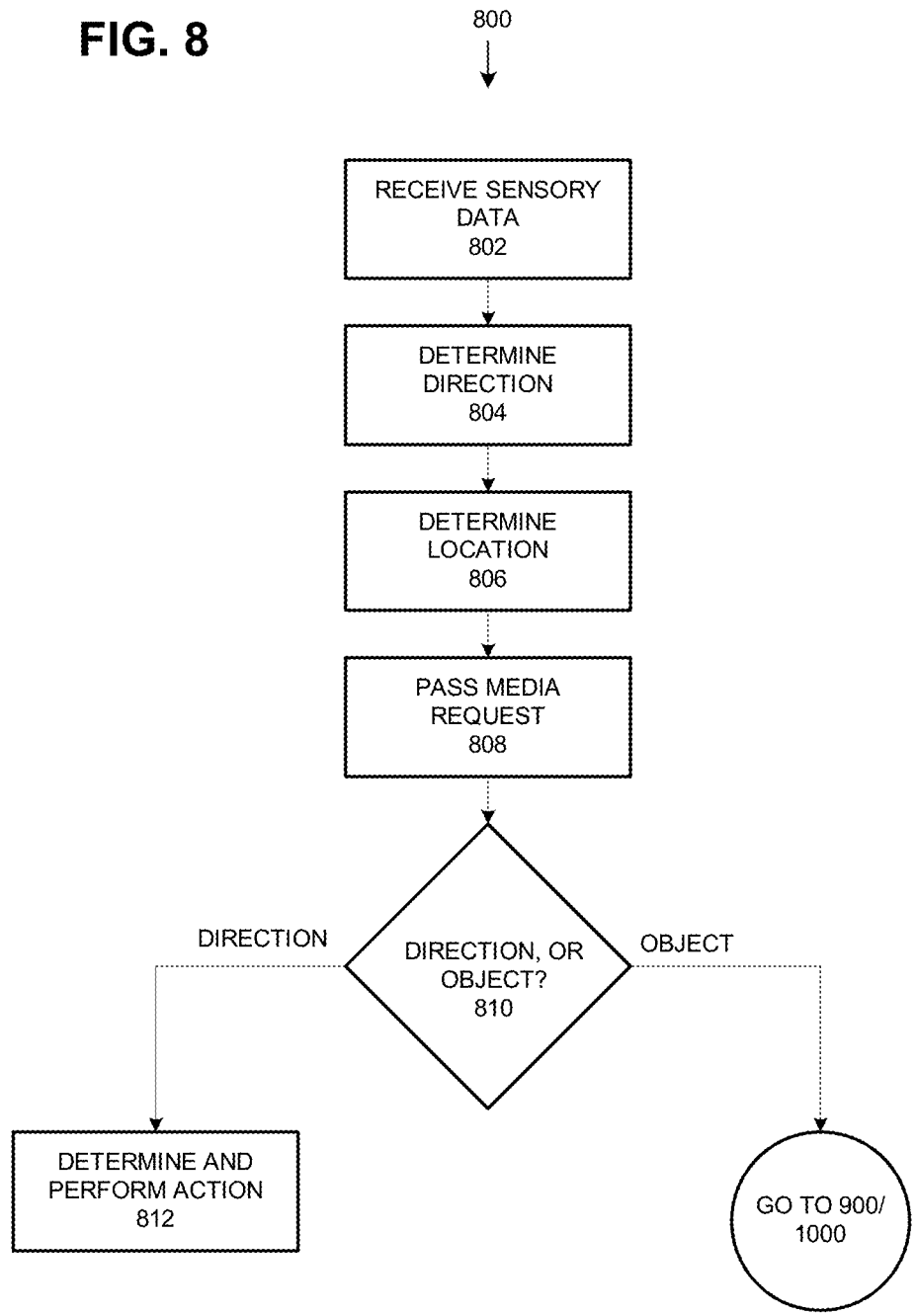
FIGS. 8 through 10 are flow diagrams of exemplary processes that are associated with the devices of FIGS. 1A-1D, 2, and/or 3.
Figure 9:
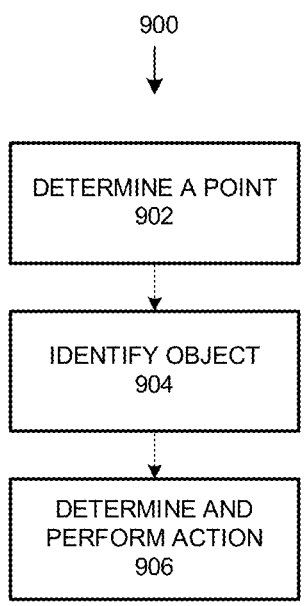
Figure 10:
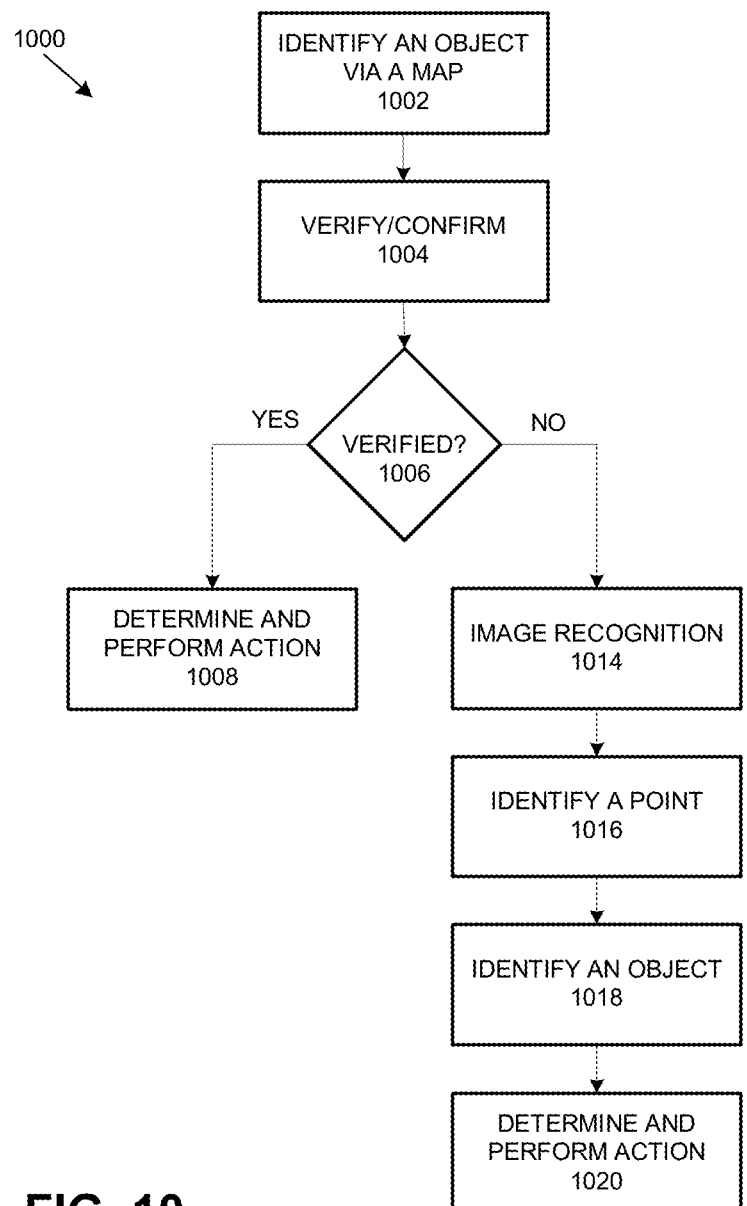

FIGS. 8-10 are flow diagrams of exemplary processes that are associated with the devices of FIGS. 1A-1D, 2, and/or 3. Processes 800-1000 may be performed by one or more of devices 202-206 and 300, depending on the implementation. FIG. 8 is a flow diagram of an exemplary overall process 800 related to selecting a gazed direction/an object and performing actions related to AV data associated with the selected gazed direction/object.

Process 800 may begin with mobile communication device 204 receiving sensory data from media presentation device 202/300 (block 802). As discussed above, the sensory data may include one or more of: images of user's eyes (for eye tracking); images of scenes/objects in front of media presentation device 202/300 (for image recognition); distances between media presentation device 202; and objects in front of media presentation device 202; the orientation of user's head 102, and/or the location of media presentation device 202.

Depending on the implementation, mobile communication device 204 may determine the overall direction of the user's gaze (block 804). As discussed above, for applications that are involved with physical coordinates (e.g., applications that use the direction of the user's gaze to identify a real object being gazed at), mobile communication device 204 may determine the overall direction of the gaze based on the orientation of the user's head and the direction of the user's eyes relative to user's head. Alternatively, mobile communication device 204 may simply use the orientation of the user's head to approximate the overall direction of the user's gaze. For other types of applications, mobile communication device 204 may not determine the overall direction of the user's gaze, but simply use the direction of the user's gaze relative to user's head 102.

Depending on the implementation, mobile communication device 204 may obtain the location of the user (block 806). For example, for applications involved with physical locations, mobile communication device 204 may determine the physical location of the user via, for example, a GPS receiver installed within mobile communication device 204. For some applications, mobile communication device 204 may determine a virtual location of the user. For other applications in which the physical or virtual location is not needed, mobile communication device 204 may omit performing block 806.

Mobile communication device 204 may pass a media request to media logic 510/704, in either mobile communication device 204 or server device 206 (block 808). As discussed above, depending on the implementation, media logic 510/704 may reside within either mobile communication device 204 or server device 206.

Depending on the implementation, the media request may include different types of information. Furthermore, depending on the implementation, upon receipt of the media request, media logic 510/704 may perform different processes. If media logic 510/704 is to perform functions that are associated with gazed directions (block 810), media logic 510/704 may proceed to block 812, to determine and perform actions that are described below with respect to FIG. 11. If media logic 510/704 is to perform functions that are associated with object identified by the direction of the gaze (block 810: object), media logic 510/704 may proceed to processes 900 or 1000, described below.

FIG. 9 is a flow diagram of exemplary process 900 pertaining to AV data associated with a gazed object according to one implementation. Media logic 510/704 may determine, given user's field of view, the coordinates of a point at which the user gazes, based on information in the media request (block 902). For example, assuming that the user is wearing a virtual/augmented reality glasses, media logic 510/704 may determine the coordinates of the point based on the direction of the user's eyes. In another example, assuming that the user is looking at a display of mobile communication device 204, media logic 510/704 may determine the coordinates of the gazed point based on the direction of the user's gaze as well as the orientation of the user's head.

Media logic 510/704 may identify an object whose image on the display includes the gazed point (block 904). Based information about images, on the display, that correspond to different objects, media logic 510/704 may determine which image encompasses the point, and therefore, identify the object corresponding to the image. Once media logic 510/704 identifies the object, media logic 510/704 and devices of FIGS. 1A-1D, 2, and/or 3 may perform additional actions pertaining to AV data associated with the object, described below with reference to FIG. 11.

FIG. 10 is a flow diagram of exemplary process 1000 pertaining to AV data associated with a gazed object according to another implementation. Process 1000 may include media logic 510/704 identifying an object based on the media request (block 1002). For example, media logic 510/704 may use the information about the physical location of the user, the overall direction of the user's gaze, and maps in database 520 or 702, to identify physical objects (e.g., buildings and/or other landmarks) that are in the user's line of sight. Of the physical objects in the line of sight, media logic 510/704 may select the object closest to the user.

Media logic 510/704 may verify that the user is gazing at the selected object (block 1004). Media logic 510/704, for example, may compare distance information provided in the media request (e.g., distance between mobile communication device 204 and a gazed object) to a distance between the user and the object identified at block 1002. If the distances are approximately equal, media logic 510/704 may conclude that the object identified at block 1002 is the gazed object. In another example, media logic 510/704 may compare an image of the selected object (e.g., retrieved from a database) to an image of the gazed object provided in the media request. If the images match, media logic 510/704 may conclude that the identified object is the object at which the user is gazing.

If media logic 510/704 determines that the identified object is the gazed object based on the verification (block 1006: yes), media logic 510/704 and devices of FIGS. 1A-1D, 2, and/or 3 may perform additional actions pertaining to AV data associated with the object (block 1008), described below with reference to FIG. 11.

If media logic 510/704 determines that the identified object is not the gazed object based on the verification at block 1004 (block 1006: no), media logic 510/704 may conclude that the gazed object is a mobile object whose information cannot be found within a map database. Accordingly, media logic 510/704 may attempt to identify the gazed object via other processes associated with blocks 1014-1018.

For example, media logic 510/704 may perform an image recognition based on images of the user's view, provided in the media request (block 1014). For example, assume that the media request includes an image of view 602. Media logic 510/704 may recognize and identify automobile 604.

Media logic 510/704 may identify, within the image of the view (e.g., view 602), a point at which the user gazes (block 1016). Based on information on what region of the user's view the image occupies and the relative direction of the user's gaze, media logic 510/704 may determine the coordinates of the point within the image.

Media logic 510/704 may identify an object whose image includes the gazed point (block 1018). Based on the images, on a display, that correspond to different objects, media logic 510/704 may determine which of the images includes the point, and may identify the object corresponding to the image. Once media logic 510/704 identifies the object, media logic 510/704 and devices of FIGS. 1A-1D, 2, and/or 3 may perform additional actions pertaining to AV data associated with the identified object (block 1018). These actions are described below with reference to FIG. 11.

Figure 11:
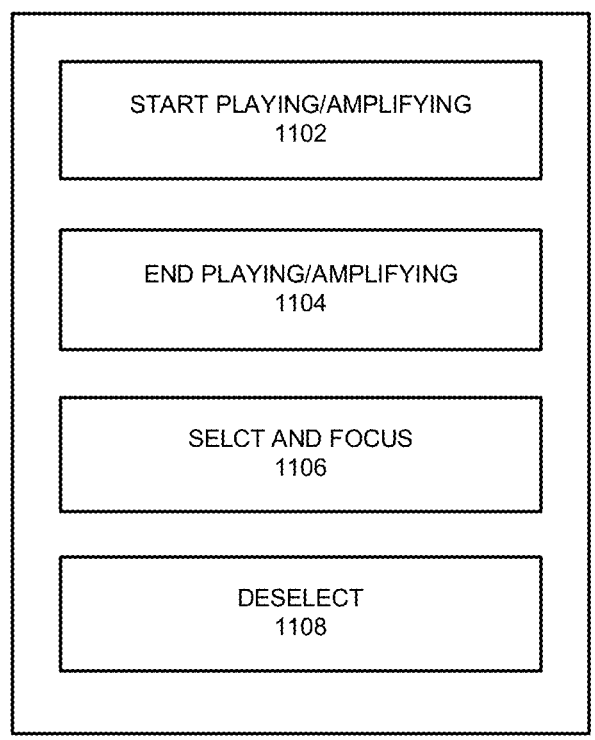
FIG. 11 illustrate actions that devices of FIGS. 1A-1D, 2, and 3 may perform after the object at which the user gazes has been identified.

FIG. 11 illustrates different actions that devices of FIGS. 1A-1D, 2, and 3 may perform after the direction of the gaze or the gazed object is identified. As shown, media logic 510/704 and/or devices in FIGS. 1A-1D, 2, and 3 may start amplifying AV data that is associated with the object (1102), end playing or amplifying the AV data (1104), select and focus (1106, and deselect 1108.

Starting playing/amplifying action 1102 may include media logic 510/704 retrieving AV data that is associated with the direction of the gaze or the gazed object. The AV data may be fetched from a cache or from a database (e.g., database 520/702), using the direction or an object identifier as a key. If the AV data is not already being presented to the user, media logic 510/704 may amplify the AV data and/or play the AV data, either at mobile communication device 204 or at another device (e.g., media presentation device 202/300).

Ending playing/amplifying action 1104 may include media logic 510/704 determining whether the direction of the current gaze is same as the direction of the previous gaze, or, alternatively, determining whether an object previously selected (e.g., for playing AV data associated with the object) by the user's gaze is no longer the object currently gazed. If the direction of the gaze has changed or the previously gazed object is no longer being gazed, media logic 510/704 may cause mobile communication device 204 to stop amplifying the AV data and sending the corresponding audio signal to media presentation device 202/300.

Selecting and focusing action 1106 may include media logic 510/704 detecting that the user has been gazing in a particular direction or at an object for a given period of time. Once media logic 510/704 determines that the user is focused in a direction or on an object for the required period, media logic 510/704 may perform different additional actions on AV data associated with the direction/object.

For example, assume that media logic 510/704 is part of a virtual reality application and the user is wearing ear buds 202. In this case, media logic 510/704 may transform the AV data such that if a sound corresponding to the AV data were generated at ear buds 202, the sound would be perceived by the user as if it were amplified and emanating from the center of the user's view. Media logic 510/704 may play the transformed AV data at mobile communication device 204 or at media presentation device 202/300.

In another example, once media logic 510/704 determines that the user is focused in a direction, media logic 510/704 may lock the point selected by the gaze (e.g., source of the sound) in the 3D audio space. When the user changes the orientation of the user's head, the location from which the sound is perceived to emanate may stay locked at the same position relative to the user's head. That is, when the user changes the orientation of the user's head, the sound source moves to retain its same position relative to the user's head.

Deselecting an object action 1108 may include detecting user's head movement (e.g., shaking the user's head up and down or sideways) or facial feature (e.g., via camera) and using the detected motion as a cue for deselecting the object from a fixed location in the user's field of view.

The actions listed in FIG. 11 are exemplary. Depending on the implementation, media logic 510/704 and/or devices in FIGS. 1A-1DD, 2, and 3 may perform actions other than those listed in FIG. 11. For example, media logic 510/704 may perform actions that are based on the distance between the gazed object and the user. Since a gazed object may have a direction, speed, accelerations, etc., as the user's eyes track the trajectory of the object in 3D audio space, media logic 510/704 may produce the sound in accordance with the speed, trajectory, and distance of the object (e.g., transform the sound to apply a Doppler shift, change the volume of the sound based on the distance of the object form the user, etc.).

In emulating sounds from different positions within virtual/physical 3D audio space, mobile communication device 204 may perform additional signal processing, such as, for example, applying a head-related transfer function (HRTF) to the audio portion of the AV data, depending on the location of the object in the user's field of vision.

CONCLUSION

In the above In the following, a device may determine user's head orientation and/or the direction of the user's gaze. Based on the user's head orientation and/or the direction of the gaze, the device may perform actions pertaining to AV data that is associated with an object at which the user gazes.

The foregoing description of implementations provides illustration, but is not intended to be exhaustive or to limit the implementations to the precise form disclosed. Modifications and variations are possible in light of the above teachings or may be acquired from practice of the teachings.

In the above, while series of blocks have been described with regard to the exemplary processes, the order of the blocks may be modified in other implementations. In addition, non-dependent blocks may represent acts that can be performed in parallel to other blocks. Further, depending on the implementation of functional components, some of the blocks may be omitted from one or more processes.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A mobile communication device comprising:
one or more communication interfaces configured to:
  communicate with a media presentation device; and
one or more processors configured to:
  receive, via the one or more communication interfaces, from the media presentation device, sensory data comprising information describing orientation of the media presentation device, and scene information representative of an image of a three dimensional audio space adjacent to a user, receive a media request comprising selected information related to one or more objects, determine an approximate direction of a gaze of the user in the three dimensional audio space based on the information describing the orientation of the media presentation device, query a map database based on the selected information of the media request to identify a sound source in the three dimensional audio space at which the user gazes by:
- identifying an object in the three dimensional audio space based on a location of the user, the approximate direction of the gaze, and information in the map database; and
- determining whether the identified object is the sound source at which the user gazes by at least one of: i) determining whether an image obtained from the scene information matches an image of the identified object obtained from the map database; and/or ii) determining whether a distance from the identified object to the user is approximately equal to a distance from the sound source at which the user gazes to the user;

obtain audio data based on the identified sound source at which the user gazes, determine an action to perform on the obtained audio data associated with the identified sound source at which the user gazes, and perform the determined action.

2. The mobile communication device of claim 1, wherein when the one or more processors determine the action, the one or more processors are further configured to modify the obtained audio data such that a sound generated based on the obtained audio data is amplified.

3. The mobile communication device of claim 2, wherein when the one or more processors determine the action, the one or more processors are further configured to receive additional sensory data that describes one of:
- a change in facial feature of the user; or
- movement of a head of the user.

4. The mobile communication device of claim 1, wherein the mobile communication device comprises one of:
- a cellular telephone;
- a laptop computer; or
- a tablet computer.

5. The mobile communication device of claim 1, wherein the sensory data further includes at least one of:
- images of the eyes of the user; or
- information describing a location of the media presentation device.

6. The mobile communication device of claim 1, wherein the media presentation device includes one of:
- a pair of ear buds;
- a pair of virtual reality glasses; or
- a pair of augmented reality glasses.

7. A device comprising:

sensors configured to:
- collect sensory data comprising images of eyes of a user and scene information representative of an image of an audio space adjacent to the user; and one or more processors configured to:
- receive the sensory data from the sensors,
- receive a media request comprising selected information related to one or more images of sound sources,
- determine an approximate direction of a gaze of the user based on the images, included in the sensory data, of the eyes of the user,
- query a map database based on the selected information of the media request to identify a sound source at which the user gazes by:
  - identifying an object in the audio space based on a location of the user, the approximate direction of the gaze, and information in the map database; and
  - determining whether the identified object is the sound source at which the user gazes by at least one of: i) determining whether an image obtained from the scene information matches an image of the identified object obtained from the map database; and/or ii) determining whether a distance from the identified object to the user is approximately equal to a distance from the sound source at which the user gazes to the user;
- obtain audio data associated with the identified sound source at which the user gazes based on an identity of the identified sound source at which the user gazes,
- determine an action to perform on the obtained audio data associated with the identified sound source at which the user gazes, and
- perform the determined action.

8. The device of claim 7, wherein when the one or more processors perform the determined action, the one or more processors are configured to:
- apply a transformation to the obtained audio data to amplify an audio signal corresponding to the obtained audio data; and
- send the amplified audio signal to a remote media presentation device.

9. The device of claim 7, wherein when the one or more processors perform the determined action, the one or more processors are further configured to:
- apply a head-related transform to the obtained audio data to generate a stereo sound that is perceived by the user as emanating from a specific location of an image of the identified sound source at which the user gazes in a three dimensional audio space.

10. A method comprising:

receiving, from a media presentation device worn by a user, sensory data comprising i) information describing an orientation of the media presentation device, and ii) scene information representative of an image of a three dimensional audio space adjacent to the media presentation device;

receiving a media request comprising selected information related to one or more images of sound sources;

determining an approximate direction of a gaze of the user in the three dimensional audio space based on the information describing the orientation of the media presentation device;

querying a map database based on the selected information of the media request to identify a sound source at which the user gazes by:
- identifying an object in the three dimensional audio space based on a location of the user, the approximate direction of the gaze, and information in the map database; and
- determining whether the identified object is the sound source at which the user gazes by at least one of: i) determining whether an image obtained from the scene information matches an image of the identified object obtained from the map database; and/or ii)

determining whether a distance from the identified object to the user is approximately equal to a distance from the sound source at which the user gazes to the user;

obtaining audio data associated with the identified sound source at which the user gazes based on an identity of the identified sound source at which the user gazes;

determining an action to perform on the obtained audio data associated with the identified sound source at which the user gazes; and performing the determined action.

11. The method of claim 10, wherein the sensory data further comprises images of the user's eyes.

12. The method of claim 11, wherein determining the approximate direction of the gaze comprises determining a direction of the gaze based on the information describing the orientation of the media presentation device and a direction of the user's eyes, wherein the direction of the user's eyes is determined based on the images of the user's eyes.

13. The method of claim 10, wherein performing the action comprises one of:

amplifying the obtained audio data; or ending amplification of the obtained audio data.

14. The method of claim 10, further comprising:

performing image recognition on the scene information received as part of the sensory data when the identified object is the sound source at which the user gazes;

identifying a set of images corresponding to a set of objects based on the image recognition;

selecting, among the identified set of images, a selected image based on the approximate direction of the gaze; and identifying the sound source at which the user gazes as the identified sound source based on the selected image and information associated with the selected image.

15. The method of claim 10, wherein identifying the sound source at which the user gazes comprises:

determining a point, in a field of view of the user in the three dimensional audio space, at which the user gazes based on the approximate direction of the gaze; and identifying the object as an object whose corresponding image, in the field of view, includes the point.

16. The method of claim 15, wherein performing the determined action comprises:

locking the sound source at which the user gazes in a particular location within the three dimensional audio space.

17. The method of claim 16, wherein the three dimensional audio space includes a virtual three dimensional audio space.

18. The method of claim 10, wherein identifying the sound source at which the user gazes comprises:

sending information describing the location of the user and the approximate direction of the gaze to a remote device over an associated network, wherein the remote device is configured to identify the sound source at which the user gazes and retrieve the audio data from an audio database based on the identity of the identified sound source at which the user gazes; and wherein the obtaining the audio data comprises receiving the audio data from the remote device via the associated network.

* * * * *